(12) United States Patent
Chakra et al.

(10) Patent No.: US 8,949,556 B2
(45) Date of Patent: Feb. 3, 2015

(54) CLOUD MANAGEMENT OF DEVICE MEMORY BASED ON GEOGRAPHICAL LOCATION

(71) Applicant: International Business Machines Corporation, Armonk, NY (US)

(72) Inventors: Al Chakra, Apex, NC (US); John A. Feller, Cary, NC (US); Trudy L. Hewitt, Cary, NC (US); Francesco C. Schembari, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 13/709,393

(22) Filed: Dec. 10, 2012

(65) Prior Publication Data

US 2014/0164719 A1    Jun. 12, 2014

(51) Int. Cl.
  *G06F 12/14*  (2006.01)
  *G06F 12/00*  (2006.01)
  *G06F 12/12*  (2006.01)

(52) U.S. Cl.
  CPC .............. *G06F 12/00* (2013.01); *G06F 12/122* (2013.01)
  USPC ............ 711/159; 711/161; 711/165; 711/171

(58) Field of Classification Search
  USPC .................................. 711/159, 161, 165, 171
  See application file for complete search history.

(56) References Cited

U.S. PATENT DOCUMENTS

| | | | |
|---|---|---|---|
| 6,317,875 B1 * | 11/2001 | Grimsrud et al. | 717/174 |
| 6,530,081 B1 | 3/2003 | Hayes, Jr. | |
| 7,137,099 B2 | 11/2006 | Knight et al. | |
| 7,779,055 B2 | 8/2010 | Peng | |
| 2005/0212807 A1 * | 9/2005 | Premchandran | 345/530 |
| 2008/0034182 A1 | 2/2008 | Takemura | |
| 2009/0181668 A1 * | 7/2009 | Silver et al. | 455/432.3 |
| 2010/0077017 A1 | 3/2010 | Martinez et al. | |
| 2010/0302958 A1 | 12/2010 | Wietfeldt et al. | |
| 2011/0131203 A1 | 6/2011 | Bodin et al. | |
| 2011/0138050 A1 | 6/2011 | Dawson et al. | |
| 2011/0151892 A1 | 6/2011 | Vengroff et al. | |
| 2012/0023226 A1 | 1/2012 | Petersen et al. | |
| 2012/0042036 A1 | 2/2012 | Lau et al. | |
| 2012/0122482 A1 | 5/2012 | Rajaniemi | |
| 2012/0151314 A1 | 6/2012 | Campbell et al. | |

OTHER PUBLICATIONS

Munoz et al., "Designing Context-Aware Interactions for Task-Based Applications," Proceedings of the 10th International Conference on Current Trends in Web Engineering (ICWE '10), Jul. 2010, pp. 463-473.

Chakra et al., "Cloud Management of Device Memory Based on Geographical Location," U.S. Appl. No. 13/775,894, filed Feb. 25, 2013, 40 pages.

Mell et al., "The NIST Definition of Cloud Computing," National Institute of Standards and Technology, Information Technology Laboratory, Version 15, Oct. 2009, 2 pages.

* cited by examiner

*Primary Examiner* — Jae Yu (74) *Attorney, Agent, or Firm* — Yee & Associates, P.C.; Parashos T. Kalaitzis (57) ABSTRACT

An apparatus and computer program product for managing memory of a device is disclosed. A computer system collects information about use, by the device, of data in the memory of the device. The information collected by the computer system includes a time and a location for which each portion of the data is used by the device. The computer system identifies patterns of use, by the device, of each portion of the data based on the information collected. The computer system then selects one or more portions of the data that are not needed in the memory of the device based on the patterns of use by the device.

5 Claims, 8 Drawing Sheets

CLOUD MANAGEMENT OF DEVICE MEMORY BASED ON GEOGRAPHICAL LOCATION

BACKGROUND

1. Field

The disclosure relates generally to a data processing environment and, in particular, to managing memory of a device in the data processing environment. Still more particularly, the present disclosure relates to using information about the use of portions of data by the device to manage the one or more portions of the data in the memory.

2. Description of the Related Art

Cloud computing involves the delivery of computing resources of a data processing environment. Through the use of services hosted in the data processing environment, cloud computing provides users access to the computing resources of the data processing environment. Computing resources of a cloud computing provider may include hardware resources, software, information, storage, and other services. Computing resources of a cloud computing provider may be located in a single location or widely distributed.

The data processing environments of a cloud computing provider are typically located at server computers in a location that is remote to the users. The computing resources in the data processing environments of a cloud computing provider may be provided by the user, by the cloud computing provider, and by third-party providers of computing resources. The users of a particular data processing environment of a cloud computing provider may be consumers and corporate users. In some situations the users of a data processing environment may also be corporate users from two or more corporations who are sharing use of resources.

A user of a mobile computing device may use particular data, applications, and computing resources at one location and different data, applications, and computing resources at other locations. For example, data used at each particular location may correspond to clients of the user at each particular location. As another example, when traveling a mobile device may be used for navigation, when at a work the mobile device may be used for collaboration with clients and peers, and when at home the mobile device may be used for entertainment. Thus, each different location, where the mobile device is used, may require different applications to be installed and running on the mobile device. Also, each different location, where the mobile device is used, may require different data to be stored and/or made readily available to the mobile device for use at the location.

However, the user may not have enough storage space in the mobile computing device for all of the data and applications needed at every location. Further, the user may not desire to take the time to manually download all of the data and applications needed at one location then remove the data and applications when he leaves the location to make room for the data needed at other locations.

One known solution to the problem of insufficient space in a storage device is to stream the data when the user makes a selection. However, network bandwidth necessary for streaming the data may be limited. Further, interruptions such as network outages may occur. Delays caused by these limitations and interruptions may be undesirable to the user.

Therefore, it would be advantageous to have a method and apparatus that takes into account at least some of the issues discussed above, as well as possibly other issues.

SUMMARY

In illustrative embodiments an apparatus and computer program product for managing memory of a device can be provided. In one embodiment a computer system collects information about use, by the device, of data in the memory of the device. The information collected by the computer system includes a time and a location for which each portion of the data is used by the device. The computer system identifies patterns of use, by the device, of each portion of the data based on the information collected. The computer system then selects one or more portions of the data that are not needed in the memory of the device based on the patterns of use by the device.

DETAILED DESCRIPTION

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including, but not limited to, wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages. The program code may be run entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are processed via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported which provides transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
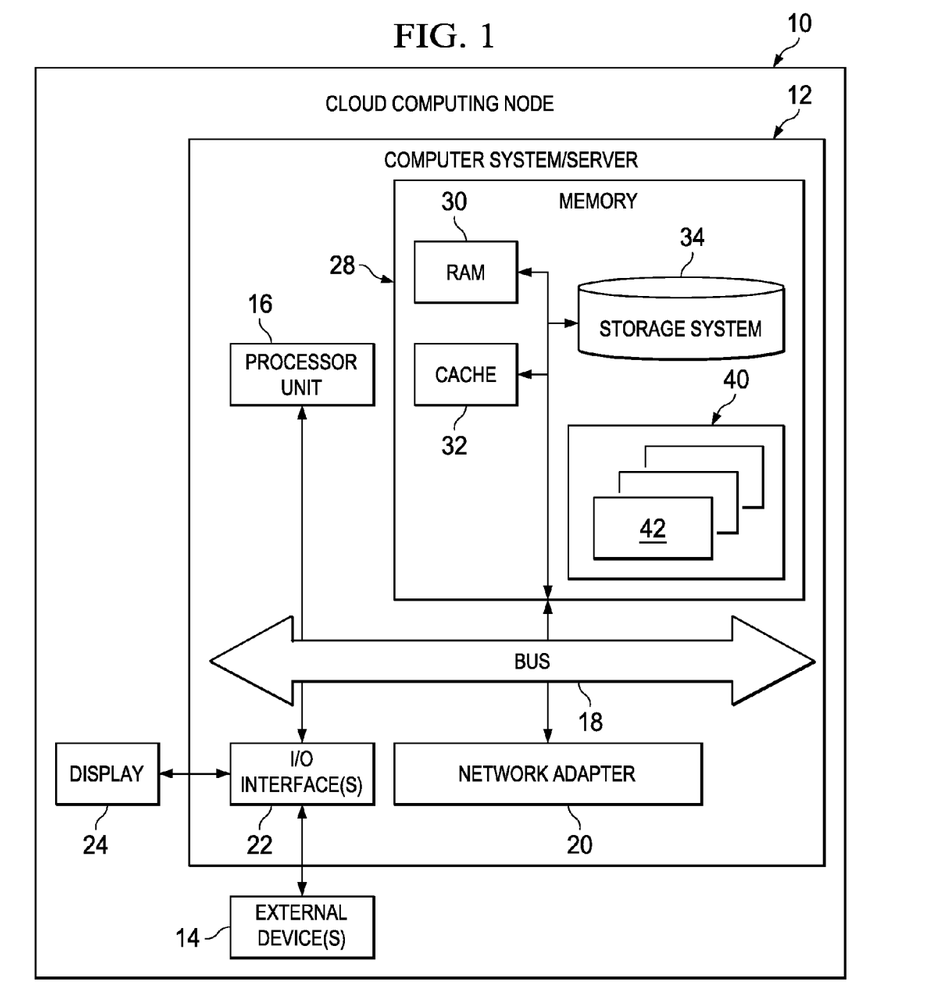
FIG. 1 is an illustration of a cloud computing node in accordance with an illustrative embodiment.

Referring now to FIG. 1, an illustration of a cloud computing node is shown in accordance with an illustrative embodiment. Cloud computing node 10 is only one example of a suitable cloud computing node and is not intended to suggest any limitation as to the scope of use or functionality of embodiments of the invention described herein.

Regardless, cloud computing node 10 is capable of being implemented and/or performing any of the functionality set forth hereinabove.

In cloud computing node 10 there is computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being run by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processor unit 16, memory 28, and bus 18 that couples various system components including memory 28 to processor unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20.

As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
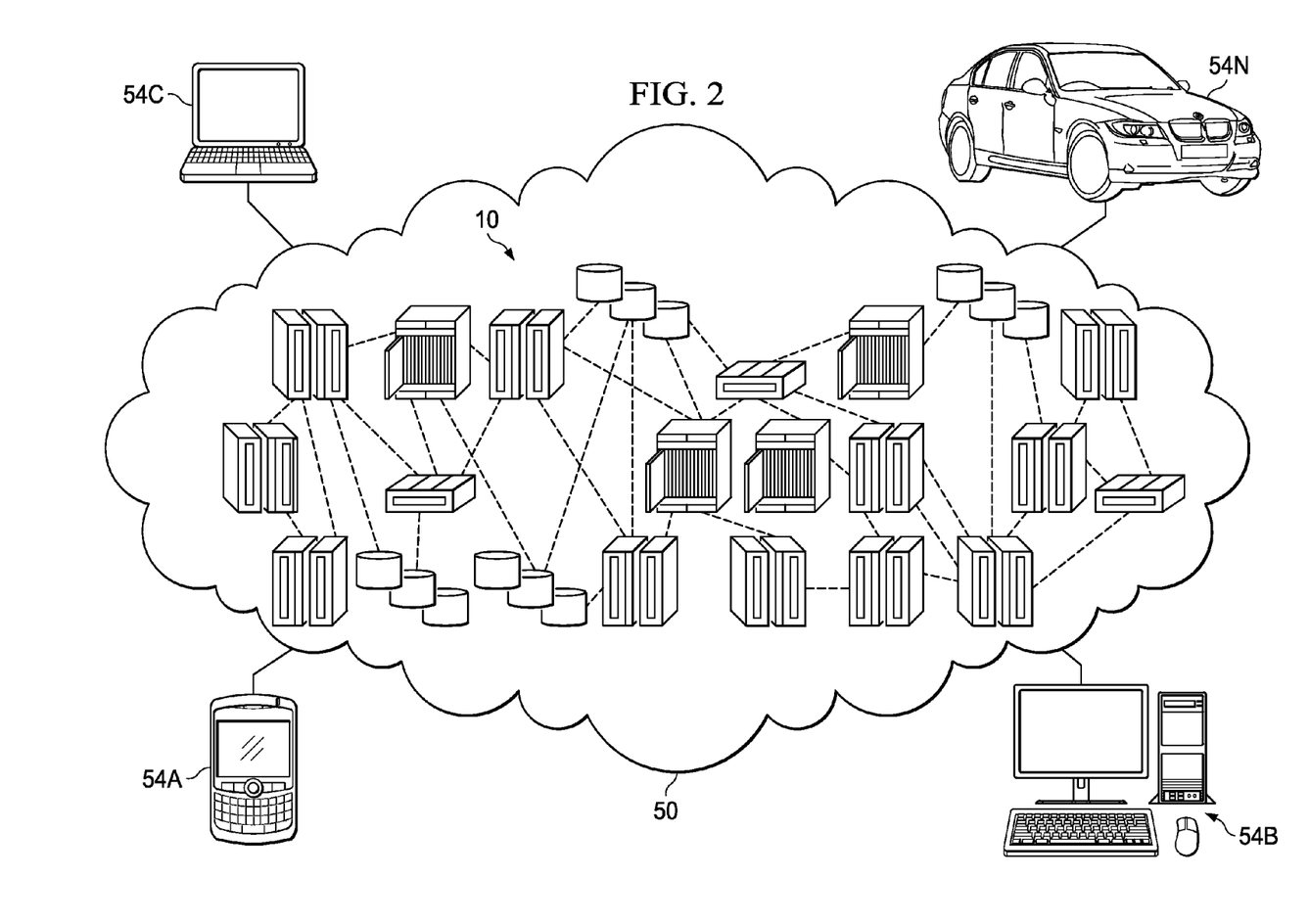
FIG. 2 is an illustration of a cloud computing environment in accordance with an illustrative embodiment.

Referring now to FIG. 2, an illustration of a cloud computing environment 50 is depicted in accordance with an illustrative embodiment. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that cloud computing nodes 10 and cloud computing environment 50 can communicate with any type of computerized device over any type of network and/or network addressable connection (e.g., using a web browser).

Figure 3:
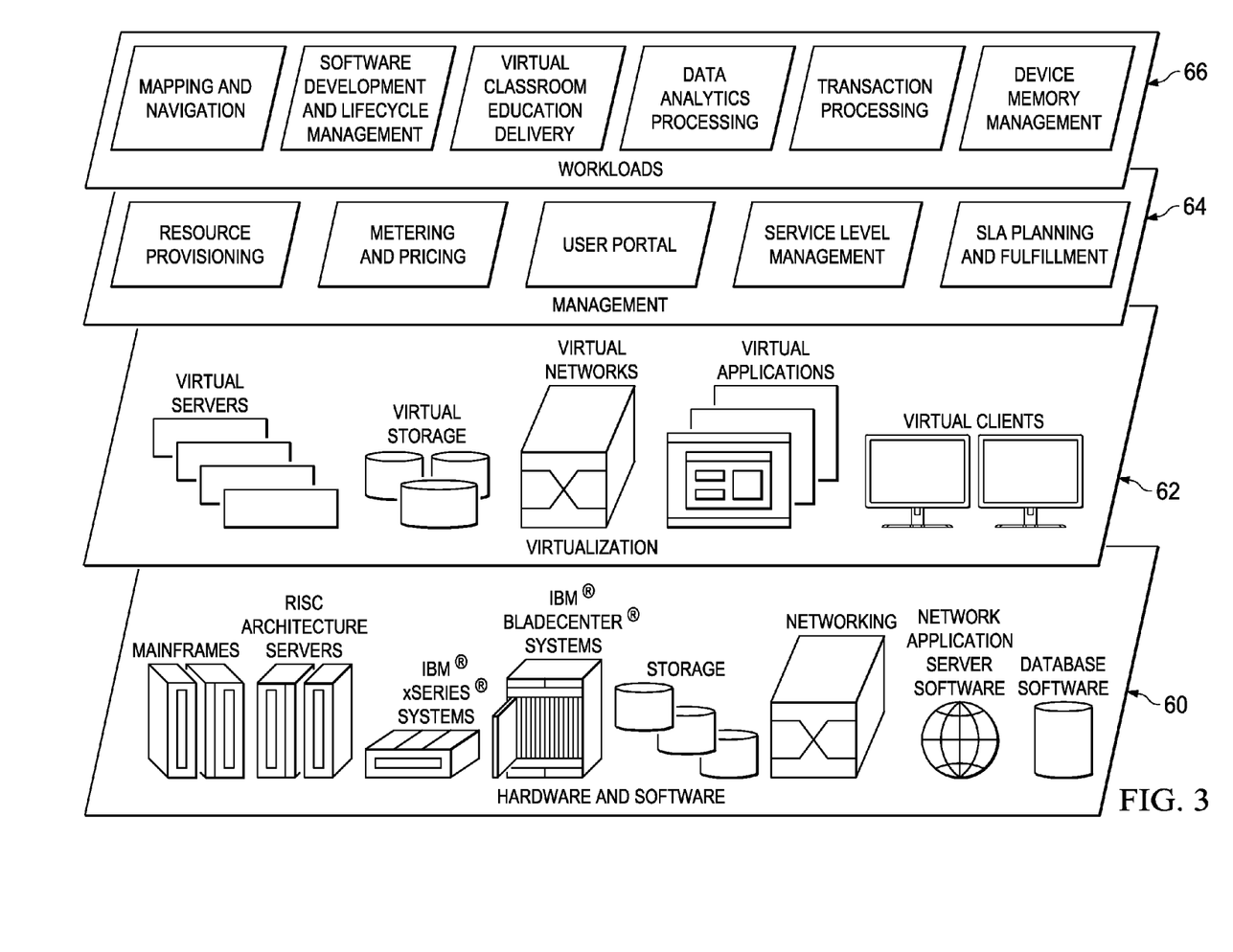
FIG. 3 is an illustration of a set of functional abstraction layers of a cloud computing environment in accordance with an illustrative embodiment.

Referring now to FIG. 3, an illustration of functional abstraction layers provided by cloud computing environment 50 in FIG. 2 is shown in accordance with an illustrative embodiment. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; and networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and device memory management.

Thus, one or more illustrative embodiments provide a method, apparatus, and computer program product for managing memory of a device. In one example, a computer system collects information about use, by the device, of data in the memory of the device. The information collected by the computer system includes a time and a location for which each portion of the data is used by the device. The computer system identifies patterns of use, by the device, of each portion of the data based on the information collected. The computer system then selects one or more portions of the data that are not needed in the memory of the device based on the patterns of use by the device.

One or more illustrative embodiments also provide a method, apparatus, and computer program product for storing one or more portions of data in remote storage based on patterns of use and then retrieving the one or more portions of data based on the patterns of use. One or more illustrative embodiments further provide a method, apparatus, and computer program product for managing memory of a device based on the patterns of use, user selected preferences, and corresponding calendar entries of users of the device. One or more illustrative embodiments still further provide a method, apparatus, and computer program product for managing memory of a device based on the patterns of use and available bandwidth of networking devices.

Figure 4:
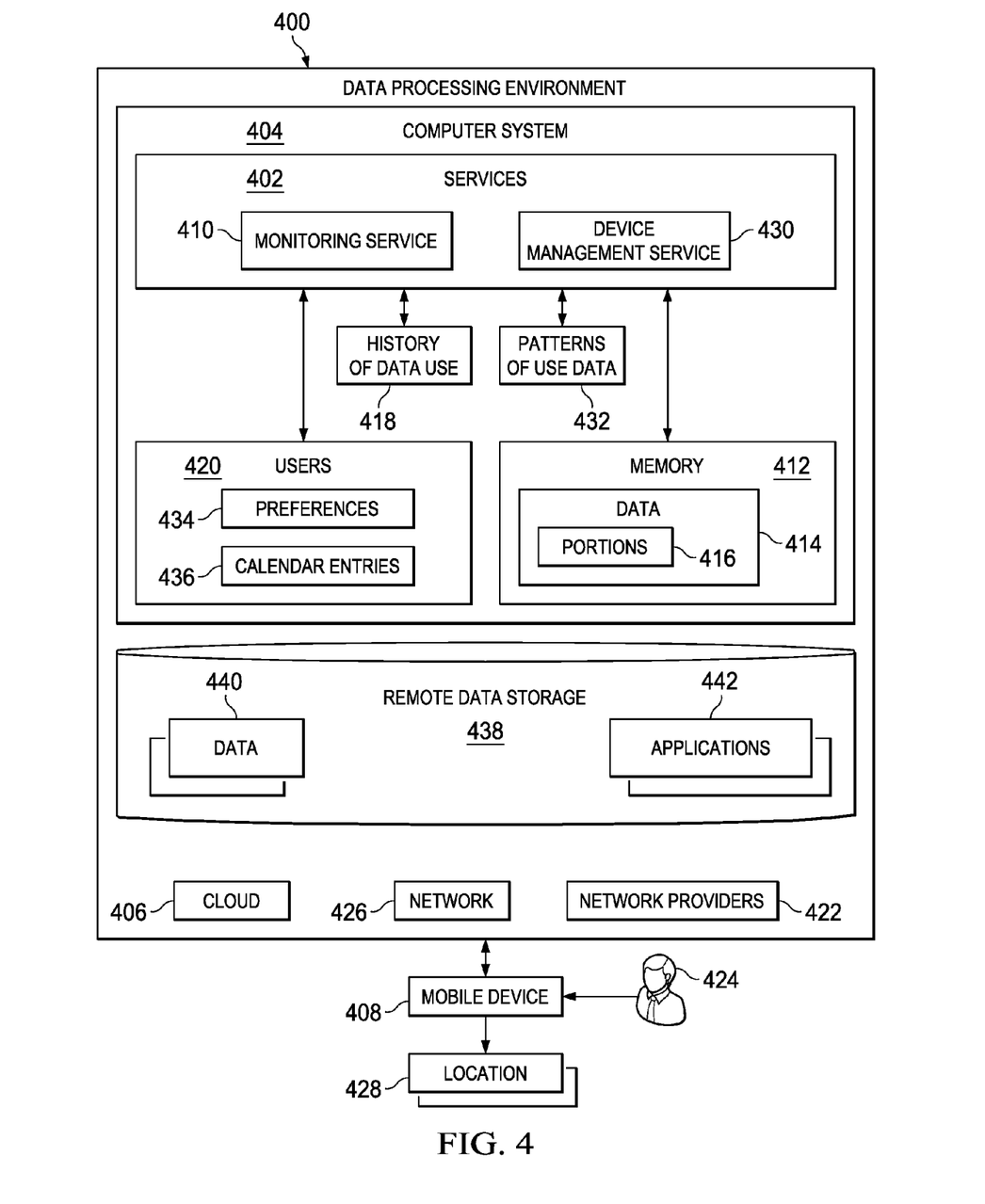
FIG. 4 is a block diagram of components involved in managing memory of a device in a data processing environment in accordance with an illustrative embodiment.

Turning now to FIG. 4, an illustration of a data processing environment is depicted in accordance with an illustrative embodiment. Data processing environment 400 is an example of an environment that may be present in different types of computing systems. For example, data processing environment 400 may be included in computer system/server 12 in FIG. 1 on a cloud computing node such as cloud computing nodes 10 in cloud computing environment 50 in FIG. 2. In this example, data processing environment 400 may provide device memory management in workloads layer 66 in FIG. 3. As another example, data processing environment 400 may be included in personal digital assistant (PDA) or cellular telephone 54A, desktop computer 54B, laptop computer 54C, and/or automobile computer system 54N.

As depicted, services 402 in computer system 404 may be located in data processing environment 400 for managing memory of a device. In these illustrative examples, computer system 404 includes hardware and software for running services 402. In these illustrative examples, computer system 404 may take the form of cloud 406. Cloud 406 may include one or more computer systems, such as computer system/server 12 on cloud computing nodes 10 in cloud computing environment 50 in FIG. 2. Computer system 404 may also take the form of mobile device 408. In these illustrative examples, mobile device 408 may be a personal digital assistant, a smart phone, a laptop computer, an automobile computer system, and any other portable computing device.

In these illustrative examples, monitoring service 410 is a service in services 402. Monitoring service 410 collects information about use of memory 412 by a device, such as by mobile device 408. As depicted, memory 412 may be located in computer system 404. Memory 412 may also be located in a computing device remote from computer system 404, such as mobile device 408. In these illustrative examples, the information collected by monitoring service 410 includes information about use of data 414 in memory 412. As depicted, data 414 includes one or more portions 416. In these illustrative examples, portions 416 in data 414 may comprise one or more of applications, documents, photos, audio recordings, videos, email, device specific information, and any other suitable type of data for use by computer system 404. For example, device specific information used by mobile device 408 may include configuration information for mobile device 408 and data particularly formatted for use in mobile device 408 by applications in mobile device 408.

As depicted, the information collected by monitoring service 410 about use of data 414 may take the form of history of data use 418. For example, monitoring service 410 may store collected information about use of data 414 in history of data use 418 in computer system 404. In these illustrative examples, history of data use 418 may include a time and a location that portions 416 of data 414 are used, users 420 of mobile device 408 during the time at the location that portions 416 of data 414 are used, corresponding available bandwidth of networking devices of network providers 422 of mobile device 408 during the time at the location that portions 416 of data 414 are used, and any other suitable information about use of data 414. In these illustrative examples, a time that portions 416 are used may include start time, end time, and/or duration of time portions 416 are used. In these illustrative examples, users 420 include one or more users such as user 424. User 424 may be an owner of mobile device 408. User 424 may be authorized or not authorized to use mobile device 408. For example, users 420 may include one or more of family members, friends, clients, customers, associates, and any other type of users of mobile device 408.

In these illustrative examples, network providers 422 provide access to network 426 for mobile device 408. For example, mobile device 408 may use network providers 422 to retrieve portions 416 for use by an application running in mobile device 408. As depicted, location 428 is a place where mobile device is located when portions 416 of data 414 are used by mobile device. In these illustrative examples, location 428 may be a place where clients of user 424 are located, a home of user 424, a place of business of user 424, a place of commerce, a destination in a calendar entry of user 424, and any other suitable physical location for mobile device 408. In these illustrative examples, location 428 may be a geographical location designated by geographical coordinates of a geographical positioning system (GPS). Location 428 of mobile device 408 may also be a logical location designated by a description of the location, such as in a car, in a chair, in a meeting, in a type of room, outside, inside, and any other suitable logical location for use in locating mobile device 408.

Device management service 430 is another service located in services 402 in computer system 404. As depicted, device management service 430 identifies patterns of use data 432 from history of data use 418. In these illustrative examples, patterns of use data 432 may be for one or more portions in portions 416 of data 414. Patterns of use data 432 may be determined by device management service 430 based on a frequency of use of portions 416. The frequency of use of portions 416 may be based on one or more of a number of times mobile device 408 uses portions 416, a number of times mobile device 408 uses portions 416 at location 428, and a number of times mobile device 408 uses portions 416 at particular times of the day, week, month, and times identified in a type of calendar event of user 424.

As depicted, device management service 430 selects one or more portions of data 414 that are not needed in memory 412 and another one or more portions of data that are needed in memory 412. In these illustrative examples, determining whether or not one or more portions of data 414 are needed in memory 412 may be selected based on patterns of use of data 432, preferences 434, available bandwidth of networking devices, and calendar entries 436. Preferences 434 and calendar entries 436 may be selected by users 420, in these illustrative examples. Preferences 434 include one or more of a time frame for obtaining selected portions of the data from the network, a distance of the device from a selected location, a type of data of the one or more portions, a subject of the one or more portions, a size of the one or more portions, a selected application, and other suitable preferences in data processing environment 400. In these illustrative examples, one or more entries in calendar entries 436 may include a particular location where the device will be located, a period of time that the device will be at the location, and an identification of each portion of data required for use by mobile device 408 at the particular location for the period of time.

In these illustrative examples, device management service 430 may store one or more portions of data 414 that are not needed in memory 412 in remote data storage 438. Device management service 430 may also remove from memory 412 one or more portions of data 414 responsive to determining that one or more portions of data 414 are not needed in memory 412. Device management service 430 may further retrieve one or more portions of data 414 from remote data storage 438 responsive to determining the one or more portions of data 414 are needed in memory 412. As depicted, remote data storage 438 may be storage provided by a cloud computing platform, such as cloud computing environment 50 in FIG. 2. As depicted, remote data storage 438 may be used by computer system 404 as storage for mobile device 408 for data 440 and applications 442. In these illustrative examples, remote data storage 438 may be one or more storage devices in hardware and software layer 60 in FIG. 3.

For example, a particular calendar entry in calendar entries 436 of user 424 may comprise a subject of the meeting, files and applications needed for the meeting, start time of the meeting, duration of the meeting, and a location of the meeting. In this example, device management service 430 may use a current location of mobile device 408 and/or a current time and location to determine which files and applications are currently needed and which files applications currently not needed in memory 412. Further in this example, device management service 430 may move data to and from remote data storage 438 responsive to whether or not the data is needed in memory 412.

In these illustrative examples, device management service 430 may schedule the sending of portions of data 414 that are not needed in memory 412 to remote data storage 438, the removal from memory 412 portions of data 414 that are not needed in memory 412, and retrieval from remote data storage 438 portions of data 414 that are needed in memory 412. For example, device management service 430 may determine an amount of time needed to perform the sending, removal, and retrieval of portions of data 414 based on the collected information about available bandwidth of network devices. In this example, device management service 430 may perform the sending, removal, and retrieval of portions of data 414 based on the time needed using a predicted available bandwidth of networking devices that will be available to mobile device 408 along a route to a location in an upcoming calendar entry.

The illustration of data processing environment 400 in FIG. 4 is not meant to imply physical or architectural limitations to the manner in which an illustrative embodiment may be implemented. Other components in addition to and/or in place of the ones illustrated may be used. Some components may be unnecessary. Also, the blocks are presented to illustrate some functional components. One or more of these functional components may be combined, divided, or combined and divided into different blocks when implementing an illustrative embodiment.

For example, although computer system 404 has been described with respect to cloud 406, other illustrative embodiments may be applied to other types of network data processing systems in addition to and/or in place of cloud 406. As one illustrative example, computer system 404 may be a local area network (LAN), a wide area network (WAN), an intranet, the Internet, or some combination thereof. As another illustrative example, although services 402 has been described as software, hardware, or a combination of the two on computer system 404 or on another computer system in data processing environment 400, other resources may also be used. For example, a preselected web site may be used by device management service 430 to retrieve data for use in memory 412 by mobile device 408. In this example, the web site may include client information for use by an application in computer system 404. As another example, a predefined calendaring server may be used by device management service 430 to retrieve calendar entries 436.

Figure 5:
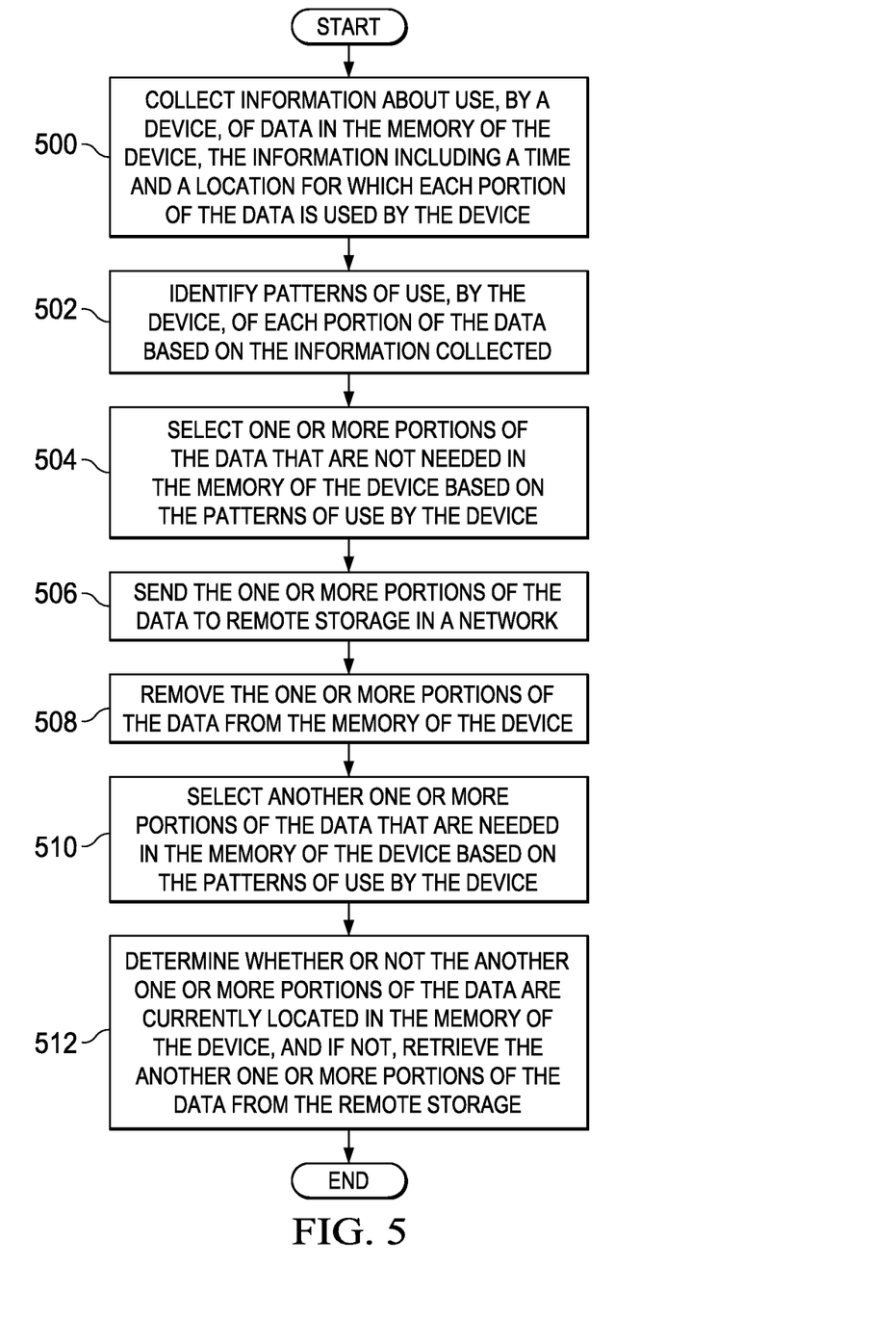
FIG. 5 is a flowchart of a process for managing memory of a device based on patterns of use of data in the memory of the device in accordance with an illustrative embodiment.

With reference now to FIG. 5, an illustrative example of a flowchart of a process for managing memory of a device based on patterns of use of data in the memory of the device is depicted in accordance with an illustrative embodiment. The steps in FIG. 5 may be implemented in software, hardware, or a combination of the two in computer system 404 in data processing environment 400 in FIG. 4. In particular, the steps may be implemented by monitoring service 410 and device management service 430.

The process begins by collecting information about use, by a device, of data in the memory of the device, the information including a time and location for which each portion of the data is used by the device (Step 500). For example, the device is an example of mobile device 408 in FIG. 4, the information collected is an example of history of data use 418 in FIG. 4, each portion of the data is an example of portions 416 of data 414 in FIG. 4, and the memory is an example of memory 412 in FIG. 4.

The process then identifies patterns of use, by the device, of each portion of the data based on the information collected (Step 502). For example, the patterns of use identified are an example of patterns of use of data 432 in FIG. 4. The process next selects one or more portions of the data that are not needed in the memory of the device based on the patterns of use by the device (Step 504). Responsive to selecting the one or more portions, the process sends the one or more portions of the data to remote storage in a network (Step 506) and then removes the one or more portions of the data from the memory device (Step 508). For example the remote storage is an example of remote data storage 438 in FIG. 4 and the network is an example of network 426 in FIG. 4.

The process selects another one or more portions of the data that are needed in the memory of the device based on the patterns of use by the device (Step 510). The process then determines whether or not the another one or more portions of the data are currently located in the memory of the device, and if not, the process retrieves the another one or more portions of the data from the remote storage (Step 512), with the process terminating thereafter.

Figure 6:
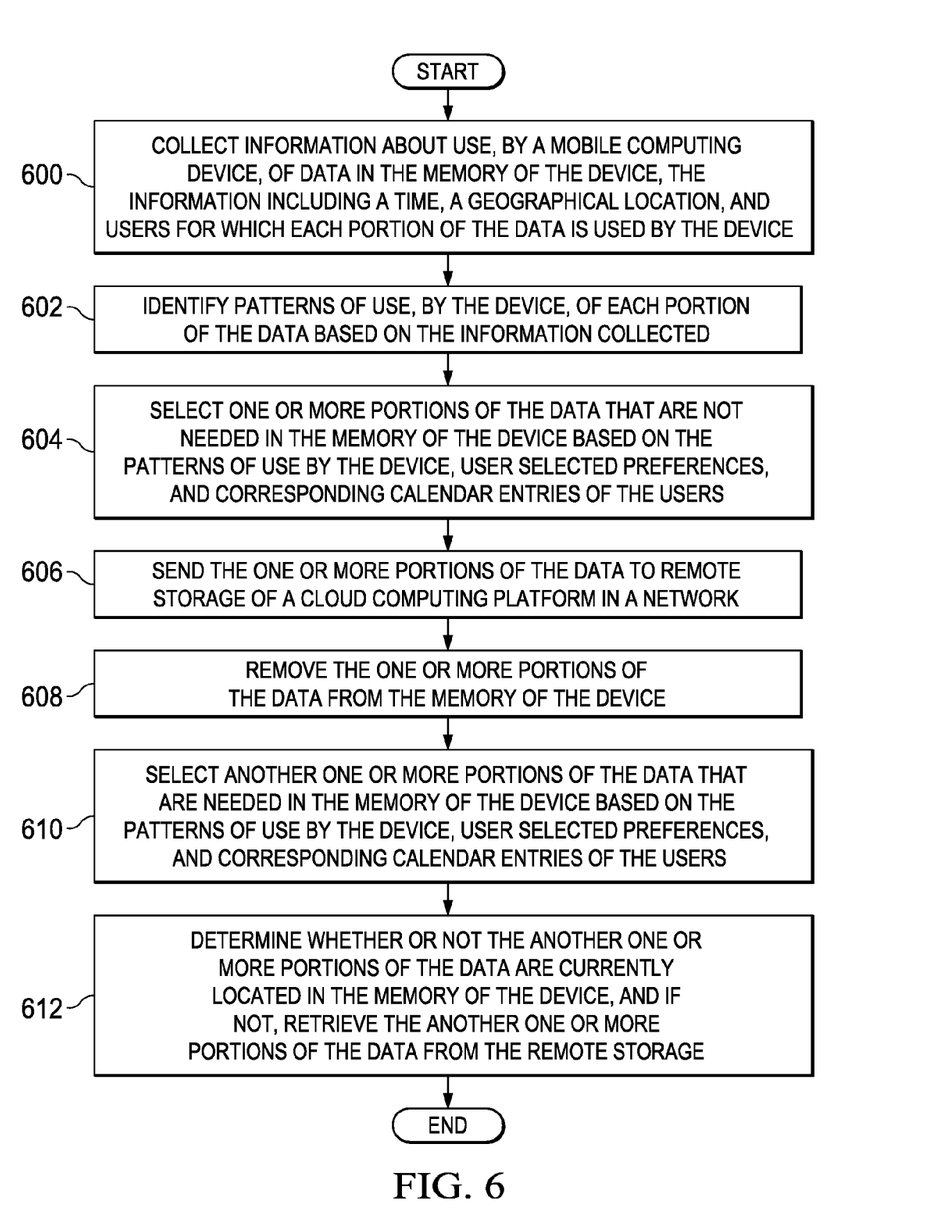
FIG. 6 is a flowchart of a process for managing memory of a mobile computing device based on collected information about use of data comprising a time of each use, a geographical location of each use, and the users of the device for each use in accordance with an illustrative embodiment.

Turning next to FIG. 6, an illustrative example of a flowchart of a process for managing memory of a mobile computing device based on collected information about use of data comprising a time of each use, a geographical location of each use, and the users of the device for each use is depicted in accordance with an illustrative embodiment. The steps in FIG. 6 may be implemented in software, hardware, or a combination of the two in computer system 404 in data processing environment 400 in FIG. 4. In particular, the steps may be implemented by monitoring service 410 and device management service 430.

The process begins by collecting information about use, by a mobile computing device, of data in the memory of the device, the information including a time, a geographical location, and users for which each portion of the data is used by the device (Step 600). For example, the mobile computing device is an example of mobile device 408 in FIG. 4, the information collected is an example of history of data use 418 in FIG. 4, each portion of the data is an example of portions 416 of data 414 in FIG. 4, and the memory is an example of memory 412 in FIG. 4.

The process then identifies patterns of use, by the device, of each portion of the data based on the information collected (Step 602). For example, the patterns of use identified are an example of patterns of use of data 432 in FIG. 4. The process next selects one or more portions of the data that are not needed in the memory of the device based on the patterns of use by the device, user selected preferences, and corresponding calendar entries of the users (Step 604). For example, the user selected preferences are examples of preferences 434 in FIG. 4 and the corresponding calendar entries of the users are examples of calendar entries 436 in FIG. 4.

Responsive to selecting the one or more portions, the process sends the one or more portions of the data to remote storage in a network (Step 606) and then removes the one or more portions of the data from the memory device (Step 608). For example the remote storage is an example of remote data storage 438 in FIG. 4 and the network is an example of network 426 in FIG. 4.

The process selects another one or more portions of the data that are needed in the memory of the device based on the patterns of use by the device, user selected preferences, and corresponding calendar entries of the users (Step 610). The process then determines whether or not the another one or more portions of the data are currently located in the memory of the device, and if not, the process retrieves the another one or more portions of the data from the remote storage (Step 612), with the process terminating thereafter.

Figure 7:
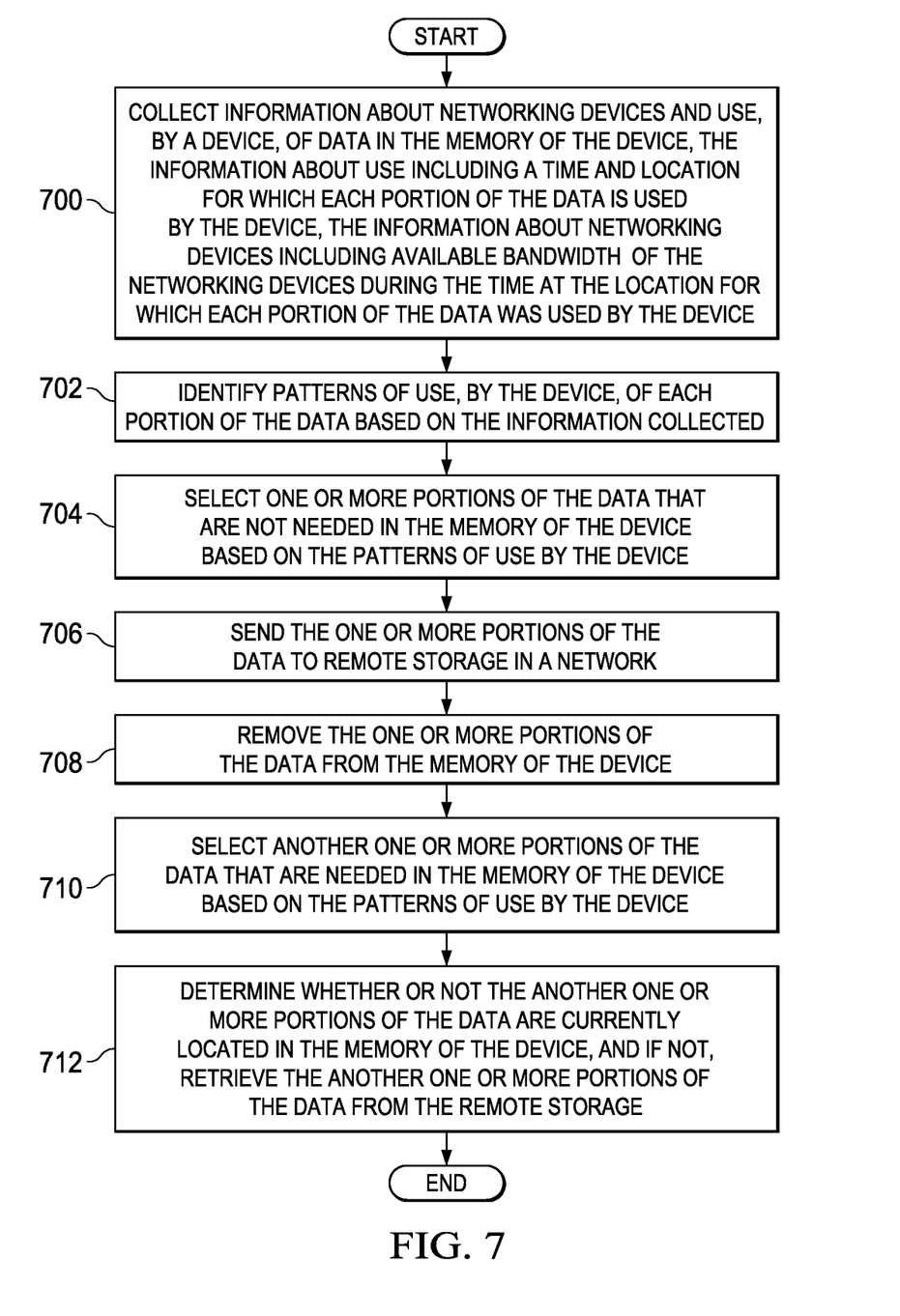
FIG. 7 is a flowchart of a process for managing memory of a device based on collected information about networking devices and collected information about use of data in the memory of the device in accordance with an illustrative embodiment.

Turning next to FIG. 7, an illustrative example of a flowchart of a process for managing memory of a device based on collected information about networking devices and collected information about use of data in the memory of the device is depicted in accordance with an illustrative embodiment. The steps in FIG. 7 may be implemented in software, hardware, or a combination of the two in computer system 404 in data processing environment 400 in FIG. 4. In particular, the steps may be implemented by monitoring service 410 and device management service 430.

The process begins by collecting information about networking devices and use, by a device, of data in the memory of the device, the information about use including a time and location for which each portion of the data is used by the device, the information about networking devices including available bandwidth of the networking devices during the time at the location for which each portion of the data was used by the device (Step 700). For example, the device is an example of mobile device 408 in FIG. 4, the information collected is an example of history of data use 418 in FIG. 4, each portion of the data is an example of portions 416 of data 414 in FIG. 4, the memory is an example of memory 412 in FIG. 4, and the networking devices are networking devices of network providers 422 in FIG. 4.

The process then identifies patterns of use, by the device, of each portion of the data based on the information collected (Step 702). For example, the patterns of use identified are an example of patterns of use of data 432 in FIG. 4. The process next selects one or more portions of the data that are not needed in the memory of the device based on the patterns of use by the device (Step 704). Responsive to selecting the one or more portions, the process sends the one or more portions of the data to remote storage in a network (Step 706) and then removes the one or more portions of the data from the memory device (Step 708). For example the remote storage is an example of remote data storage 438 in FIG. 4 and the network is an example of network 426 in FIG. 4.

The process selects another one or more portions of the data that are needed in the memory of the device based on the patterns of use by the device (Step 710). The process then determines whether or not the another one or more portions of the data are currently located in the memory of the device, and if not, the process retrieves the another one or more portions of the data from the remote storage (Step 712), with the process terminating thereafter.

Figure 8:
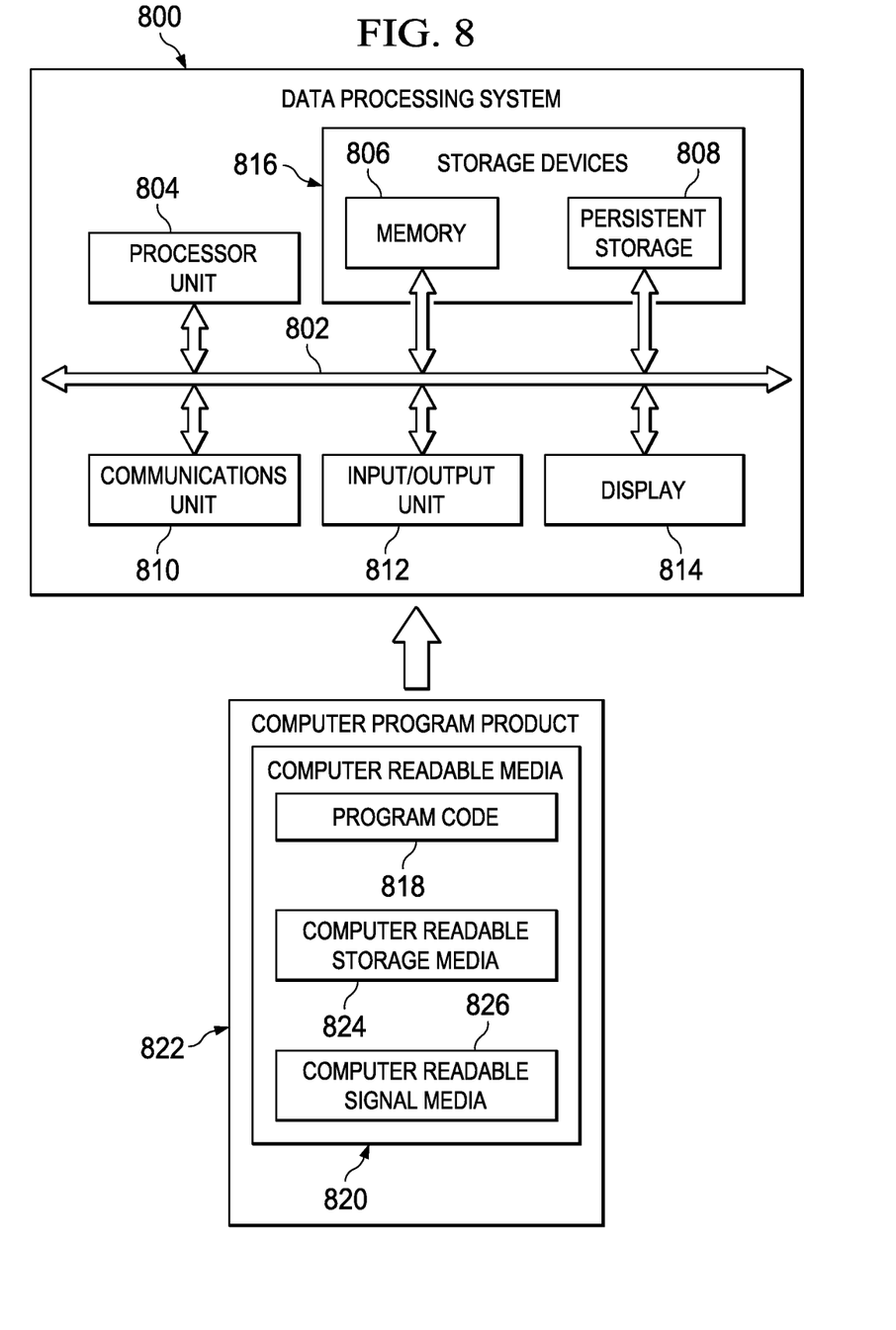
FIG. 8 is an illustration of a data processing system in accordance with an illustrative embodiment.

Turning now to FIG. 8, an illustration of a data processing system is depicted in accordance with an illustrative embodiment. In this illustrative example, data processing system 800 includes communications fabric 802, which provides communications between processor unit 804, memory 806, persistent storage 808, communications unit 810, input/output unit 812, and display 814. Data processing system 800 is an example of a data processing system that may be used to implement managing a service in a network data processing system. Data processing system 800 is also an example of a data processing system that may be used to implement computer system/server 12 and cloud computing nodes such as cloud computing node 10 in FIG. 1. Data processing system 800 also may be used to implement personal digital assistant (PDA) or cellular telephone 54A, desktop computer 54B, laptop computer 54C, automobile computer system 54N, and/or other local computing devices used by cloud consumers in FIG. 2. Data processing system 800 may also be used to implement the hardware and software components of hardware and software layer 60 in FIG. 3. More particularly, data processing system 800 may be used to implement computer system 404 in FIG. 4.

Processor unit 804 serves to process instructions for software that may be loaded into memory 806. Processor unit 804 may be a number of processors, a multi-processor core, or some other type of processor, depending on the particular implementation. "A number," as used herein with reference to an item, means one or more items. Further, processor unit 804 may be implemented using a number of heterogeneous processor systems in which a main processor is present with secondary processors on a single chip. As another illustrative example, processor unit 804 may be a symmetric multi-processor system containing multiple processors of the same type.

Memory 806 and persistent storage 808 are examples of storage devices 816. A storage device is any piece of hardware that is capable of storing information, such as, for example, without limitation, data, program code in functional form, and/or other suitable information either on a temporary basis and/or a permanent basis. Storage devices 816 may also be referred to as computer readable storage devices in these examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these examples, provides for communications with other data processing systems or devices. In these examples, communications unit 810 is a network interface card. Communications unit 810 may provide communications through the use of either or both physical and wireless communications links.

Input/output unit 812 allows for input and output of data with other devices that may be connected to data processing system 800. For example, input/output unit 812 may provide a connection for user input through a keyboard, a mouse, and/or some other suitable input device. Further, input/output unit 812 may send output to a printer. Display 814 provides a mechanism to display information to a user.

Instructions for the operating system, applications, and/or programs may be located in storage devices 816, which are in communication with processor unit 804 through communications fabric 802. In these illustrative examples, the instructions are in a functional form on persistent storage 808. These instructions may be loaded into memory 806 for processing by processor unit 804. The processes of the different embodiments may be performed by processor unit 804 using computer-implemented instructions, which may be located in a memory, such as memory 806.

These instructions are referred to as program code, computer usable program code, or computer readable program code that may be read and processed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for processing by processor unit 804. Program code 818 and computer readable media 820 form computer program product 822 in these examples. In one example, computer readable media 820 may be computer readable storage media 824 or computer readable signal media 826.

Computer readable storage media 824 may include, for example, an optical or magnetic disk that is inserted or placed into a drive or other device that is part of persistent storage 808 for transfer onto a storage device, such as a hard drive, that is part of persistent storage 808. Computer readable storage media 824 also may take the form of a persistent storage, such as a hard drive, a thumb drive, or a flash memory, that is connected to data processing system 800.

In some instances, computer readable storage media 824 may not be removable from data processing system 800. In these examples, computer readable storage media 824 is a physical or tangible storage device used to store program code 818 rather than a medium that propagates or transmits program code 818. Computer readable storage media 824 is also referred to as a computer readable tangible storage device or a computer readable physical storage device. In other words, computer readable storage media 824 is media that can be touched by a person.

Alternatively, program code 818 may be transferred to data processing system 800 using computer readable signal media 826. Computer readable signal media 826 may be, for example, a propagated data signal containing program code 818. For example, computer readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 818 may be downloaded over a network to persistent storage 808 from another device or data processing system through computer readable signal media 826 for use within data processing system 800. For instance, program code stored in a computer readable storage medium in a server data processing system may be downloaded over a network from the server to data processing system 800. The data processing system providing program code 818 may be a server computer, a client computer, a remote data processing system, or some other device capable of storing and transmitting program code 818. For example, program code stored in the computer readable storage medium in data processing system 800 may be downloaded over a network from the remote data processing system to the computer readable storage medium in data processing system 800. Additionally, program code stored in the computer readable storage medium in the server computer may be downloaded over the network from the server computer to a computer readable storage medium in the remote data processing system.

The different components illustrated for data processing system 800 are not meant to provide architectural limitations to the manner in which different embodiments may be implemented. The different illustrative embodiments may be implemented in a data processing system including components in addition to and/or in place of those illustrated for data processing system 800. Other components shown in FIG. 8 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 804 may take the form of a hardware unit that has circuits that are manufactured or configured for a particular use. This type of hardware may perform operations without needing program code to be loaded into a memory from a storage device to be configured to perform the operations.

For example, when processor unit 804 takes the form of a hardware unit, processor unit 804 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic device, a field programmable logic array, a field programmable gate array, and other suitable hardware devices. With this type of implementation, program code 818 may be omitted, because the processes for the different embodiments are implemented in a hardware unit.

In still another illustrative example, processor unit 804 may be implemented using a combination of processors found in computers and hardware units. Processor unit 804 may have a number of hardware units and a number of processors that are configured to run program code 818. With this depicted example, some of the processes may be implemented in the number of hardware units, while other processes may be implemented in the number of processors.

In another example, a bus system may be used to implement communications fabric 802 and may be comprised of one or more buses, such as a system bus or an input/output bus. Of course, the bus system may be implemented using any suitable type of architecture that provides for a transfer of data between different components or devices attached to the bus system.

Additionally, communications unit 810 may include a number of devices that transmit data, receive data, or transmit and receive data. Communications unit 810 may be, for example, a modem or a network adapter, two network adapters, or some combination thereof. Further, a memory may be, for example, memory 806, or a cache, such as found in an interface and memory controller hub that may be present in communications fabric 802.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof.

Thus, the illustrative embodiments provide a method, apparatus, and computer program product for managing memory of a device. In one example, a computer system collects information about use, by the device, of data in the memory of the device. The information collected by the computer system includes a time and a location for which each portion of the data is used by the device. The computer system identifies patterns of use, by the device, of each portion of the data based on the information collected. The computer system then selects one or more portions of the data that are not needed in the memory of the device based on the patterns of use by the device. In another example, the computer system sends the one or more portions of the data to remote storage in a network and then removes the one or more portions of the data from the memory of the device. In still another example, the computer system selects one or more portions of the data that are needed in the memory of the device based on the patterns of use by the device. In this example, the computer system determines whether or not the needed one or more portions of the data are currently located in the memory of the device, and if not, retrieves the needed one or more portions of the data from the remote storage.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application, or technical improvement over technologies found in the marketplace, or to enable others of ordinary skill in the art to understand the embodiments disclosed herein.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

What is claimed is:

1. An apparatus for managing one or more memories of a device, the apparatus comprising:
   one or more processor units;
   first program code to collect information about use, by the device, of data in the one or more memories of the device, the information including a time and a location for which each portion of the data is used by the device;
   second program code to identify patterns of use, by the device, of each portion of the data based on the information collected;
   third program code to select one or more portions of the data that are not needed in the one or more memories of the device based on the patterns of use by the device;
   fourth program code to send the one or more portions of the data to remote storage in a network;
   fifth program code to select another one or more portions of the data that are needed in the one or more memories of the device based on the patterns of use by the device; and
   sixth program code to determine whether or not the another one or more portions of the data are currently located in the one or more memories of the device, and if not, retrieving the another one or more portions of the data from the remote storage, wherein the first program code, the second program code, the third program code, the fourth program code, the fifth program code, and the sixth program code are stored in at least one of the one or more memories of the device for execution by at least one of the one or more processor units via at least one of the one or more memories of the device.

2. The apparatus of claim 1, further comprising:
   seventh program code to remove the one or more portions of the data from the one or more memories of the device, wherein the seventh program code is stored in at least one of the one or more memories of the device for execution by at least one of the one or more processor units via at least one of the one or more memories of the device.

3. The apparatus of claim 1, wherein the information collected about use, by the device, of the data in the one or more memories of the device additionally includes users of the device during the time at the location for which each portion of the data was used by the device.

4. The apparatus of claim 1, wherein the data includes one or more of applications, documents, photos, audio recordings, videos, email, and device specific information.

5. A computer program product for managing memory of a device, the computer program product comprising:
   a computer readable storage device;
   program code, stored on the computer readable storage device, for collecting information about use, by the device, of data in the memory of the device, the information including a time and a location for which each portion of the data is used by the device;
   program code, stored on the computer readable storage device, for identifying patterns of use, by the device, of each portion of the data based on the information collected;
   program code, stored on the computer readable storage device, for selecting one or more portions of the data that are not needed in the memory of the device based on the patterns of use by the device;
   program code, stored on the computer readable storage device, for sending the one or more portions of the data to remote storage in a network;
   program code, stored on the computer readable storage device, for selecting another one or more portions of the data that are needed in the one or more memories of the device based on the patterns of use by the device; and
   program code, stored on the computer readable storage device, for determining whether or not the another one or more portions of the data are currently located in the one or more memories of the device, and if not, retrieving the another one or more portions of the data from the remote storage.

* * * * *